United States Patent
McCollough, Jr.

(10) Patent No.: US 8,013,718 B2
(45) Date of Patent: Sep. 6, 2011

(54) PHOTOELECTRIC CONTROLLER FOR ELECTRIC STREET LIGHTING

(75) Inventor: Norman D. McCollough, Jr., Sharon, NH (US)

(73) Assignee: Marmon Utility LLC, Milford, NH (US)

(*) Notice: Subject to any disclaimer, the term of this patent is extended or adjusted under 35 U.S.C. 154(b) by 829 days.

(21) Appl. No.: 12/053,050

(22) Filed: Mar. 21, 2008

(65) Prior Publication Data

US 2008/0191897 A1 Aug. 14, 2008

Related U.S. Application Data

(63) Continuation-in-part of application No. 11/274,993, filed on Nov. 16, 2005, now Pat. No. 7,369,056.

(51) Int. Cl.
*G05B 19/02* (2006.01)

(52) U.S. Cl. ............ 340/12.23; 340/635; 340/931; 340/641

(58) Field of Classification Search ........ 340/12.23, 340/635, 907, 916, 931, 10.1, 10.3, 641, 340/539.1, 588.15, 7.32; 315/129, 132, 133, 315/292–295, 312, 324, 149, 159, 316, 318, 315/320

See application file for complete search history.

(56) References Cited

U.S. PATENT DOCUMENTS

| | | | |
|---|---|---|---|
| 3,098,971 A | 7/1963 | Richardson | |
| 5,479,159 A | 12/1995 | Kelly et al. | |
| 6,791,284 B1 * | 9/2004 | Levy | 315/292 |
| 7,030,777 B1 | 4/2006 | Nelson et al. | |
| 7,050,808 B2 | 5/2006 | Janusz et al. | |
| 7,123,140 B1 | 10/2006 | Denes | |
| 7,254,372 B2 * | 8/2007 | Janusz et al. | 455/88 |
| 7,451,001 B2 * | 11/2008 | Harwood | 700/1 |
| 2009/0222223 A1 * | 9/2009 | Walters et al. | 702/58 |
| 2009/0222241 A1 * | 9/2009 | Dorogi et al. | 702/182 |

* cited by examiner

*Primary Examiner* — Toan N Pham
(74) *Attorney, Agent, or Firm* — Hayes Soloway P.C.

(57) ABSTRACT

An electric street light controller apparatus and monitoring method allows automatic street light turn-on and turn-off characteristics to be field programmable using RFID technology, lamp current magnitude recording, auxiliary sensor input, diagnostic alarming and data storage for later retrieval in a remote electric street lighting monitoring system. The apparatus and method includes, from a remotely located exciter apparatus using an antenna to transmit a specific frequency and code key to the antenna of an electric street light control and monitoring apparatus associated with the electric street light allowing remote wireless field programming of turn-on fight levels, turn-off light levels, rate of change of light levels, specific turn-on, turn-off, and turn back on sequences during dark hours, and specific remote wireless sensors or internal sensor inputs useful for radiological, biological, chemical, or environmental sensing and alarming. Additionally the method and apparatus includes a method of providing automatic diagnostics for the street lamp bulb, starter and self diagnostics of the controller itself.

19 Claims, 2 Drawing Sheets

PHOTOELECTRIC CONTROLLER FOR ELECTRIC STREET LIGHTING

RELATED APPLICATIONS

This is a continuation-in-part application of U.S. application Ser. No. 11/274,993, filed on Nov. 16, 2005 now U.S. Pat. No. 7,369,056, the disclosure of which is hereby incorporated by reference in its entirety.

BACKGROUND

1. Field of the Invention

This invention finds use in the field of electric street lighting. In particular, this invention relates to the application of RFID or similar wireless technology to operate, monitor operating characteristics and/or capture historical parametric data for one or more electric streetlights.

2. Background

Electric street lights are of a general high priority due to road safety and security issues along public streets, certain areas of high security, or any area where homeland safety and security issues arise. Previously, streetlight controllers have historically only turned the street lights on or off with a given preset light level or off after a delayed time usually 4 hours after dark.

A further problem in the current technology street light controllers is that a pulsating light source, i.e., a laser pointer, can fool the street light control and turn the street light off. This is of particular interest to those areas of high security in which the lighting conditions are of paramount importance.

Existing street light controllers also have no self-diagnostic capability in that they can not monitor lamp current to determine if a light is cycling off and on (a particular failure mode of the lamp), if the bulb is on during the daylight hours (a different typical control failure mode), or if the bulb has failed and will not turn on during the normal dark times.

Further, existing street light controls cannot be used for any type of remote sensing of the conditions of radiological, biological, chemical or environmental conditions useful in an alerting system for homeland security.

Finally, current technology street light controllers cannot wirelessly communicate with ground personnel proximate to the street light, or communicate in a peer-to peer fashion to a central data collection point.

BRIEF SUMMARY

The present invention is directed to an improved street lighting control and monitoring system that will hold the magnitude of the bulb current that flowed during the failed condition of the street light, provide specific alarms for anti-terror purposes, provide communications either proximate to the street light or peer to peer to a central data collector via RFID technology, allow remote on/off overrides using remote wireless RFID transmitters, permit field programmable turn-on and turn-off characteristics as well as delay off after dark then predictive on before dawn, and visible LED alarm conditions.

In one aspect, the present invention provides a method of wirelessly programming a streetlight controller and monitor, the method comprising: providing a turn on foot-candle level parameter to the streetlight controller and monitor; providing a turn off foot-candle level parameter to the streetlight controller and monitor; providing a delay turn off time parameter to the streetlight controller and monitor; and providing a pre-set turn on time parameter to the streetlight controller and monitor.

In another aspect, the present invention provides a method of wirelessly programming a streetlight controller and monitor, the method comprising: providing a pre-set turn on time parameter to the streetlight controller and monitor, wherein the provided pre-set turn on time parameter is automatically adjusted based upon a determined time correction factor. In at least one embodiment, the time correction factor is determined by a correction factor determination method comprising the steps of: 1) storing an expected sunlight level value for a time of day; 2) measuring an actual sunlight level for the time of day; 3) determining a time difference between the expected sunlight level and the actual sunlight level; and 4) determining the time correction factor based upon the time difference. In another embodiment, the time correction factor is determined by a correction factor determination method that includes: 1) periodically determining actual sunlight levels within at least one 24 hour cycle; 2) computing a predicted sunlight level for at least one time of day in a second 24 hour cycle; 3) measuring an actual sunlight level for the at least one time of day in the second 24 hour cycle; 4) determining a time difference between the predicted sunlight level and the actual sunlight level; and 5) determining the time correction factor based upon the time difference.

BRIEF DESCRIPTION OF SEVERAL VIEWS OF THE DRAWINGS

Specific embodiments of the invention have been chosen for purposes of illustration and description, and are shown in the accompanying drawings, forming a part of the specification.

DETAILED DESCRIPTION

Figure 1:
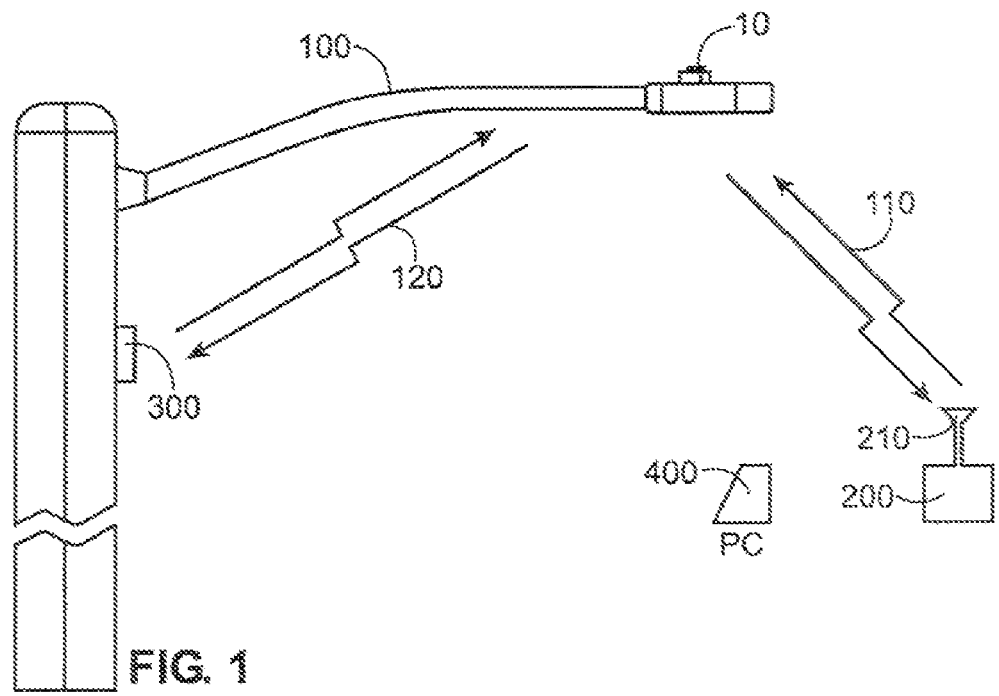
FIG. 1 is schematic diagram of the remote street light controller and monitoring system of the instant invention.
Figure 2:
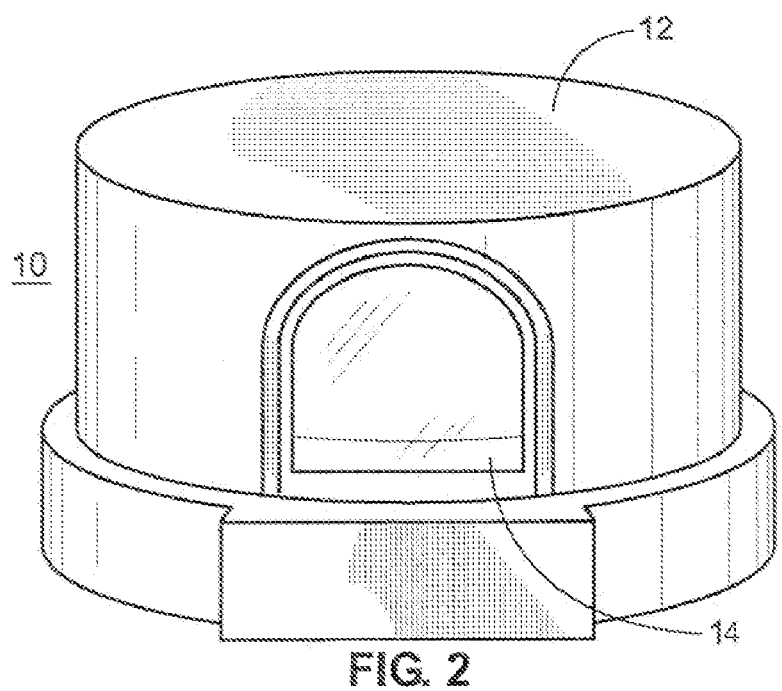
FIG. 2 is a perspective view of the exterior portion of the remote street light controller and monitoring system of the instant invention.

Referring now to the drawings, FIG. 1 illustrates the Street Light Controller and Monitor (SLCM) 10 of the instant invention mounted in a typical position on top of a representative street light 100. As is shown in FIG. 2, the exterior portion of the SLCM is comprised of a covering or shell 12 having an transparent or translucent window portion 14.

Programming of the SLCM 10 is accomplished through radio frequency transmissions 110 are sent from the antenna 210 of the exciter 200. Contained in these transmissions is a code key for the individual SLCM. Anti-collision protocols are implemented in the street light controller and monitor 10 such that only the street light controller monitor having a matching code key will respond to the exciter 200 signal. FIG. 1 further shows the exciter unit 200 collecting data from the individual SLCM 10 by way of radio frequency transmissions 110. The exciter system 200 further includes an I/O section for transferring the stored data to a host portable computer 220. The exciter 200 is configured to be portable and operate proximate to an SLCM 10.

Additionally, radio frequency transmissions 120 from a remote wireless satellite sensor device (RSSD) 300 are received by the SLCM 10 for data collection. If the RSSD 300 detects an abnormal condition of radiological, biological, chemical, or environmental conditions, a radio frequency transmission 120 to the SLCM 10 is initiated. In response, the SLCM 10 flashes an internal LED 30 (discussed below) and sends a radio frequency transmission to surrounding SLCM units 10. In this manner a peer-to-peer communications alarm condition is signaled to all surrounding SLCM units. The signals are further sent to a central collection point.

Figure 3:
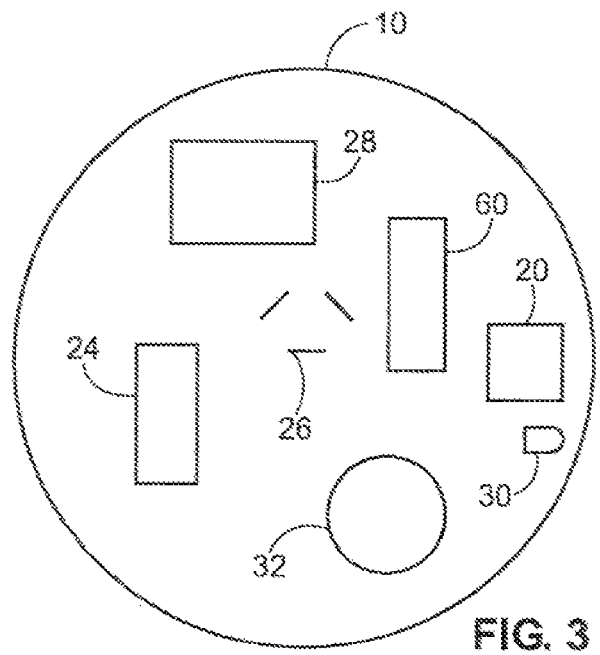
FIG. 3 is a block diagram of the street light controller and monitor.

Referring now to FIG. 3, operation of the street light controller and monitor unit is accomplished as follows: specific frequency band of sunlight levels sensed by photo-sensor 20 in window area 14 (See FIG. 2) of the SLCM 10 are converted to electrical levels corresponding to foot-candles of illumination. Printed wire connection from the photo-sensor 20 to a microprocessor control unit (MCU) 60 conveys the electrical representation of light level. The light level is stored in RAM 72 (see FIG. 4). Load Control Relay (LCR) 24 is controlled by electrical signal from the MCU 60. Load Control Relay (LCR) 24 contacts supply AC power to the twist lock contact plug 26 to allow application of power to the street lamp 10 to illuminate it. AC voltage and current from the twist lock contact plug 26 supply incoming power to power supply 28. Power supply 28 converts AC power to DC power for the DC circuitry of the SLCM 10. If an abnormal operational condition or specific alarm is sensed by MCU 60, then LED 30 enunciates error conditions. MCU 60 also monitors further, specific radiological, biological, chemical, or environmental ("RBCE") conditions sensed by RBCE sensor 32. These alarms are also enunciated by LED 26 and are transmitted in a peer-to-peer fashion by MCU 2 to other street light control monitors or to a central data collector. RBCE 5 sensor can also be remotely located from the actual SLCM 10 unit as a satellite device proximate to the SLCM 10 and wirelessly convey alarm conditions to the SLCM 10 unit. The RBCE 32 sensor located remotely from the Street Light Controller and Monitor utilizes active tag RFID technology to act as a transponder to periodic transmission of radio frequencies from the Street Light Controller and Monitor 10.

Figure 4:
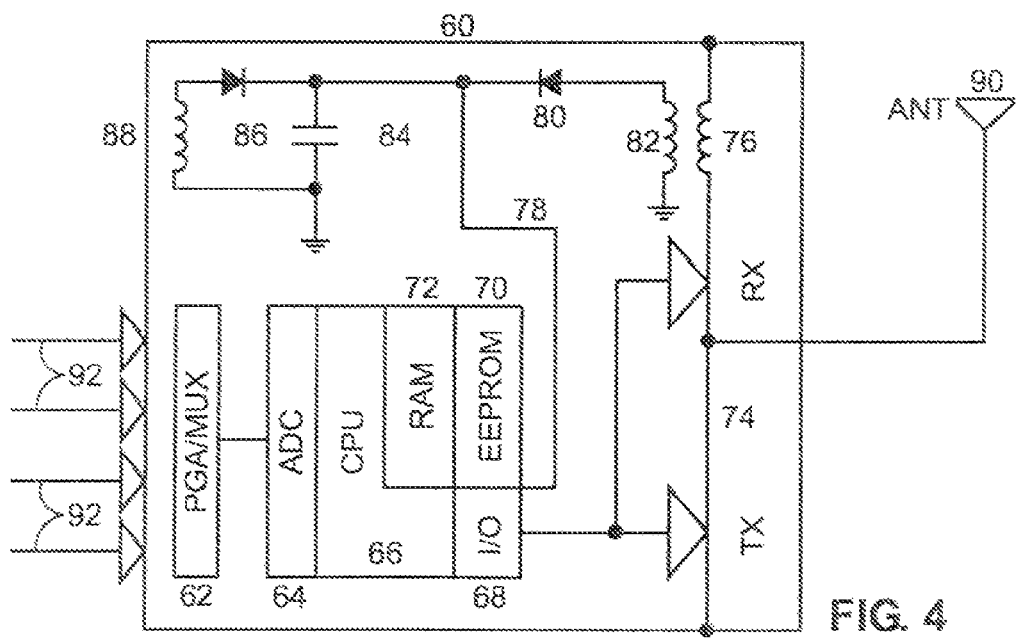
FIG. 4 is a block diagram of the street light MCU unit.

Now, referring to FIG. 4, The analog-to-digital converter (ADC) 11 internal to the MCU 60 converts the electrical signals to a digital representation of the foot-candle magnitude. Internal data stored in EEPROM (electronically alterable read-only memory) 70 are compared to the digital light level stored in RAM 72. If light levels stored in RAM memory 72 are decreasing, and have dropped below a programmable preset turn-on level in EEPROM 70 for the turn-on, the controller will turn the load control relay (LCR) 24 on and cause the street light to illuminate. Consequently; if light levels stored in RAM memory 72 are increasing, and have risen above a programmable preset level in EEPROM 70 for the turn-off, the controller will turn the load control relay (LCR) 24 off and cause the street light to extinguish. Light levels may be of an inverse ratio i.e., 1.5 foot candles off and 1.0 foot candles on. Full wireless programming of the turn-on and turn-off light levels is accomplished via the exciter 200 proximate to the street light controlled and monitor. If current levels fluctuate at some few cycles per second, the MCU 60 will determine that a "cycling bulb" problem exists with the street light and illuminate an LED 30 to indicate a warning.

In one embodiment, the street light controller and monitor can be wirelessly programmed by exciter 200 to have turn-on and turn-off characteristics as well as a delayed off after dark and a turn on before dawn. For example, the streetlight controller and monitor 10 can be provided with a turn on foot-candle level parameter, so that the streetlight will illuminate at a specified level of sunlight. A turn off foot-candle level parameter can also be provided to the streetlight controller and monitor 10, so that the streetlight will turn off at a specified level of sunlight. As an energy savings feature, a delay turn off time parameter can be provided to the street light controller and monitor 10, so that the streetlight will turn off at some time during the night. One example of delay turn off time parameter relates to turning the streetlight off at a specified amount of time after the turn on foot-candle parameter has been met. An additional feature that can be provided is a pre-set turn on time parameter, which can be provided to the streetlight controller and monitor 10 to turn the streetlight back on before daylight. One purpose of a pre-set turn on time parameter can be to turn the streetlight on at a desired amount of time before dark and/or at a desired amount of time before day at a desired amount of time before dark or at a desired amount of time before day. For example, a streetlight can be illuminated for a specified amount of time before the turn off foot-candle parameter is met, so that the streetlight will be on during pre-dawn hours when the light may be needed. Preferably, the pre-set turn on time parameter causes a streetlight to illuminate after the delay turn off time parameter has been met and before the turn off foot-candle level parameter has been met. In the embodiment illustrated in FIG. 4, the provided foot-candle level parameters and time parameters are preferably stored in the non-volatile EEPROM memory 70 of the MCU 60.

In preferred embodiments, a pre-set turn on time parameter is automatically adjusted based upon a determined time correction factor. In one embodiment, the time correction factor is determined by a correction factor determination method that includes: 1) storing an expected sunlight level value for a time of day; 2) measuring an actual sunlight level for the time of day; 3) determining a time difference between the expected sunlight level and the actual sunlight level; and 4) determining the time correction factor based upon the time difference. The expected sunlight level value can be programmed into the streetlight controller and monitor. In such embodiments, the expected sunlight level value can be based upon reference materials such as sunrise and sunset data provided by an almanac or other source. Alternatively, the expected sunlight level can be predicted by the streetlight controller and monitor 10 based upon previously measured actual sunlight levels.

In a particularly preferred embodiment, the time correction factor is determined by a correction factor determination method that includes: 1) periodically determining actual sunlight levels within at least one 24 hour cycle; 2) computing a predicted sunlight level for at least one time of day in a second 24 hour cycle; 3) measuring an actual sunlight level for the at least one time of day in the second 24 hour cycle; 4) determining a time difference between the predicted sunlight level and the actual sunlight level; and 5) determining the time correction factor based upon the time difference. The determination of actual sunlight levels is preferably accomplished in accordance with the description of the operation of the street light controller and monitor provided above. The streetlight controller and monitor preferably uses stored digital light level data to compute the predicted sunlight level for at least one time of day in the second 24 hour cycle, and the light level correction factor is preferably stored in EEPROM 70.

Still referring to FIG. 4 as well as FIG. 3, the unit power is supplied from the nominal line power supplied to the street light from the electric utility power through a twist lock connector 26, the rectified AC voltage is stored on super capacitor in power supply 28 or if no power is available, once the street light controller monitor 10 has received RF energy from the exciter 200 for some small interval of time, the unit will power up using the rectified RF energy passed through rectifier 19 and stored in a super capacitor 84 for operating power.

Again referring to FIG. 4, if the code key transmitted from the exciter 200 matches the code key stored in the MCU 60 EEPROM 70 of the street light controller and monitor unit, the street light controller and monitor 10 will respond by radio frequency transmissions of data stored in EEPROM 70. If the code key transmitted by the exciter 200 does not match the internal code key stored in the street light controller and monitor EEPROM 70, the street light controller and monitor 10 will go into a power saving sleep mode of operation.

Referring both to FIG. 1 and FIG. 4, the exciter 200 unit has a transmitting and receiving antenna 210 to transmit the RF energy of a specific frequency to the remotely located street light controller and monitor 10 through antenna 90. When the exciter unit 200 is brought in proximity to the street light controller and monitor 10, the operator initiates a signal transmission from the exciter 200. If the code keys match, data collected by the street light controller and monitor will be directed to the MCU 60 for transmission by a particular modulation scheme by RF transmitter 74 and antenna 90. Design of the particular RF modulation scheme capable of encoding the data collected in the street light controller and monitor unit is well within the skill level of those ordinarily skilled in the art. Once the data have been received at antenna 210 and demodulated by receiver and controller in the exciter 200, the data are stored in the exciter memory. The data will be stored until downloaded to a host portable computer 400. A rechargeable battery internal to the exciter will power the exciter. The active specific frequency embodiment uses technology similar to that used in radio frequency identification (RFID) tags that use the rectified radiated RF energy as an additional internal power source of the street light controller monitor device.

Location, pole number, GPS data or any number of enumeration and identification schemes used by the electric utility may be entered either electronically or manually into the host computer 400 for later use in determining the path alarm information conveyed from the street light controller monitor 10. This path information is also useful in determining path information of RBCE 32 sensor data for homeland security.

In summary, the disclosed photo-control system provides at least the following advantages over the prior art:

- An adaptive daylight following method to permit a programmable turn on before dark or before daylight a safety feature especially useful in highway street lighting applications and school bus pickup areas.
- An ability to turn off a programmable time after dark to provide an energy conservation feature.
- An ability to resist artificial light level turn off that is useful in maintaining perimeter lighting in high security areas or critical areas for vandalism or terrorist attack.
- A capability to monitor ambient levels to allow low road use times to turn off lights for long periods of no road use and to "hot start" the street light based on an increasing rate of ambient light change by an oncoming vehicle.
- A self-diagnostic capability to minimize down time. The diagnostic ability features a flashing red light during daylight hours as an alert of problems. Wireless commands from a ground remote reader/transmitter can retrieve failure information and history
- The ability to field program the turn on levels (lux), turn off levels, and various delay times over a wireless RF link.
- A method to have multiple controls gang together via a wireless command to turn oil simultaneously. This is useful in a parking lot application where all lights should turn on and off together.

From the foregoing, it will be appreciated that although specific embodiments of the invention have been described herein for purposes of illustration, various modifications may be made without deviating from the spirit or scope of the invention. It is therefore intended that the foregoing detailed description be regarded as illustrative rather than limiting, and that it be understood that it is the following claims, including all equivalents, that are intended to particularly point out and distinctly claim the subject matter regarded as the invention.

What is claimed is:

1. A method of wirelessly programming a streetlight controller and monitor, the method comprising:
   providing a turn on foot-candle level parameter to the streetlight controller and monitor;
   providing a turn off foot-candle level parameter to the streetlight controller and monitor;
   providing a delay turn off time parameter to the streetlight controller and monitor; and
   providing a pre-set turn on time parameter to the streetlight controller and monitor.

2. The method of claim 1 wherein the foot-candle level parameters and time parameters are provided by being transmitted to the streetlight controller and monitor from an exciter.

3. The method of claim 1, wherein the streetlight controller and monitor has a non-volatile EEPROM memory, and the provided foot-candle level parameters and time parameters are stored in the non-volatile EEPROM memory.

4. The method of claim 1, wherein the pre-set turn on time parameter causes a streetlight to illuminate before the turn on foot-candle level parameter has been met.

5. The method of claim 1, wherein the pre-set turn on time parameter causes a streetlight to illuminate after the delay turn off time parameter has been met and before the turn off foot-candle level parameter has been met.

6. A method of wirelessly programming a streetlight controller and monitor, the method comprising:
   providing a pre-set turn on time parameter to the streetlight controller and monitor, wherein the provided pre-set turn on time parameter is automatically adjusted based upon a determined time correction factor.

7. The method of claim 6, wherein the pre-set turn on time parameter results in the illumination of a streetlight at a desired amount of time before dark or at a desired amount of time before day.

8. The method of claim 6, wherein the time correction factor is determined by a correction factor determination method comprising the steps of:
   1) periodically determining actual sunlight levels within at least one 24 hour cycle;
   2) computing a predicted sunlight level for at least one time of day in a second 24 hour cycle;
   3) measuring an actual sunlight level for the at least one time of day in the second 24 hour cycle;
   4) determining a time difference between the predicted sunlight level and the actual sunlight level; and
   5) determining the time correction factor based upon the time difference.

9. The method of claim 8, wherein the actual sunlight levels are determined by at least a photo sensor and a microprocessor control unit.

10. The method of claim 9, wherein the photo sensor measures sunlight levels, and the measured sunlight levels are converted to an electrical representation of the sunlight level.

11. The method of claim 10, wherein the electrical representation of the sunlight level corresponds to foot-candles of illumination.

12. The method of claim 9, wherein the microprocessor control unit has an analog-to-digital converter that converts an electrical representation of the sunlight level to digital light level data.

13. The method of claim 12, wherein the digital light level data corresponds to foot-candles of illumination.

14. The method of claim 13, wherein the digital light level data is stored in RAM.

15. The method of claim 8, wherein the streetlight controller and monitor uses stored digital light level data to compute the predicted sunlight level for at least one time of day in the second 24 hour cycle.

16. The method of claim 8, wherein the light level correction factor is stored in EEPROM.

17. The method of claim 6, wherein the time correction factor is determined by a correction factor determination method comprising the steps of:
  1) storing an expected sunlight level value for a time of day;
  2) measuring an actual sunlight level for the time of day;
  3) determining a time difference between the expected sunlight level and the actual sunlight level; and
  4) determining the time correction factor based upon the time difference.

18. The method of claim 17, wherein the expected sunlight level value is programmed into the streetlight controller and monitor.

19. The method of claim 17, wherein the expected sunlight level is predicted by the streetlight controller and monitor based upon previously measured actual sunlight levels.

* * * * *